Patented July 9, 1935

2,007,510

UNITED STATES PATENT OFFICE 2,007,510

CONTROL OF TEMPERATURES IN CHEMICAL REACTIONS

Irving T. Thornton, Buffalo, N. Y., assignor to National Aniline & Chemical Co. Inc., New York, N. Y., a corporation of New York No Drawing. Application November 30, 1931, Serial No. 578,217

13 Claims. (Cl. 260—55)

This invention relates to the cooling of chemical reactions, and more particularly to improvements in the methods of producing and controlling low temperatures in chemical reactions.

It is well known that many chemical reactions must be carried out within a definite range of temperature in order to obtain a product of the best quality and in the greatest yield. In a large number of such reactions, this range of temperature lies below normal atmospheric temperatures, so that cooling is necessary for maintenance of the temperature.

One method commonly employed for obtaining a low temperature is the direct addition of ice to the reaction mixture. In many reactions, however, as for example sulfonations and nitrations wherein concentrated sulfuric acid or oleum is employed, direct cooling by means of ice cannot be employed owing to the diluting action of the water formed by melting of the ice. Furthermore, direct cooling by the addition of ice to some reaction mixtures is undesirable owing to the fact that the water introduced into the reaction mixture may combine with one or more of the ingredients present to form a hydrate, thereby altering the equilibrium conditions of the reaction mixture, and in some cases may even result in an undesired change of state of the system, such as precipitation of a salt, or the like. It has, therefore, been necessary in such cases to resort to indirect instead of direct cooling.

Thus, it has been the practice to cool the reaction mixture by means of coils immersed in the reaction mixture and through which cold water or brine is circulated. This method of cooling, however, is inefficient in reactions where a precipitate is formed during the course of the reaction and settles out, or in reactions in which the reaction mixture is in the form of a slurry, inasmuch as the solids contained in the mass tend to deposit upon the walls of the cooling coil and interfere with the transfer of heat. Internal cooling coils in such cases also cause difficulty in the removal of the reaction mixture or solid product from the vessel. In addition, internal brine cooling coils are subject to corrosion by the reaction mixtures and frequently develop leaks, causing the introduction of brine as an impurity into the reaction mixture, which is generally not discovered until the batch has been spoiled. External cooling of the reaction mixture, either by means of a coil or jacket through which cooling water or brine is circulated, has also been extensively employed, although such cooling is highly inefficient.

In many processes there is a sudden evolution of heat at a certain stage of the reaction which cannot be efficiently controlled by these indirect cooling means. Also, many reactions are preferably carried out at temperatures below the range practicably obtainable by brine cooling and it has heretofore been necessary to resort to elaborate and expensive refrigerating equipment in order to cool them adequately.

An object of the present invention is to provide a direct method of cooling a chemical reaction mixture which is simple and efficient. Other objects of the invention are to provide a direct method of cooling a reaction mixture which does not deleteriously affect the reaction mixture, to provide a simple and efficient method for the effective removal from a chemical reaction mixture of large amounts of heat which are more or less suddenly evolved, and to provide a cooling means which does not present any obstruction to agitation of the reaction mixture or interfere with the removal of a solid reaction product, but yet provides intimate contact between the cooling means and the whole mass of the reaction mixture. Other objects of the invention will in part be obvious and will in part appear hereinafter.

According to the present invention a normally gaseous material in solid or liquid (non-gaseous) form is converted to the gaseous form while in direct contact with the reaction mixture to be cooled. The cooling is preferably accomplished in practice by adding the normally gaseous material in solid or liquid form directly to the reaction mixture, and permitting it to vaporize while in contact therewith. The cooling material is preferably one which is inert (that is, chemically inert with reference to the reaction mixture or medium to which it is added), which is relatively inexpensive and easily available, and which will vaporize, and preferably boil or sublime, at a temperature which is at, or preferably substantially below, the minimum temperature desired to be maintained in the reaction mixture. Among the cooling agents which may be employed to advantage, there may be mentioned, by way of example, liquid or solid air, nitrogen, sulfur dioxide, carbon dioxide, ammonia and the like. Solid carbon dioxide, or so-called "Dry Ice", "Carbice" etc. is preferably employed in view of its ready availability as a commercial product.

The employment of a normally gaseous substance in non-gaseous form as a cooling means in accordance with the present invention has the advantages, when it is converted to a gas upon absorption of heat, that it does not contaminate the reaction mixture and does not require any particular method or means for its removal. The conversion of the solid or liquid to the gaseous form in intimate contact with the reaction mixture aids in the agitation of the reaction mixture since the small bubbles of gas evolved in the reaction mixture and escaping therefrom cause agitation in rising through the mixture. The solidified or liquefied gas, furthermore, being inert with respect to the reaction mixture tends to bring the temperature of the mixture to its own vaporization or melting point.

The invention is applicable to any reaction in which direct cooling is required to produce, control or maintain low temperatures and especially very low subnormal temperatures. It is particularly useful in the cooling of reaction mixtures to which ice cannot be directly added owing to its deleterious or undesirable action on the reaction mixture. It also finds special applicability to reactions in which there is a more or less sudden evolution of heat at some stage of the reaction.

Thus, the invention may be employed in connection with the nitration of organic compounds, particularly with mixed nitric and sulfuric acids; as for example, the nitration of acetanilide for the production of p-nitro-acetanilide where temperatures not exceeding 5° C. are preferably employed; the nitration of benzene, toluene, xylenes, phenol, the sulfonic acids of these and other compounds, etc. for the production of the corresponding nitro derivatives; and the like. It may be employed in the sulfonation of organic compounds, more particularly the sulfonation of naphthalene and its derivatives by a sulfonating agent, as for example sulfuric acid (which term is intended to include oleum), chlorosulfonic acid, sulfur trioxide, etc.

It may be employed, furthermore, in the preparation of salts of organic amines by the interaction of an organic amine with an acid, as for example, the preparation of xylidine hydrochloride. In the production of compounds of this type the amine is reacted with an excess of the concentrated acid, and, as a result of the reaction, the temperature of the mixture rises. In order to obtain the product in economical yields it is necessary to cool the reaction mixture, so that an optimum crystallization is obtained. Ice cannot be added advantageously to the reaction mixture as it has a diluting effect upon the acid, retarding and even completely preventing the crystallization of the product. Cooling by means of coils immersed in the reaction mixture is objectionable and expensive owing to the inefficient heat transfer, the danger of leakage, and the necessity of employing costly corrosion-resisting material for fabrication of the coils. External cooling is highly inefficient. Cooling of the reaction mixture in accordance with the present invention, namely, by the addition to the reaction mixture of an inert normally gaseous substance in the form of a liquid or solid (as for example, liquid air or nitrogen, solid carbon dioxide, etc.), provides a highly advantageous method for preparing the compounds of this type, as the gas evolved in cooling, being inert, has no harmful effect upon the ingredients or product and is dissipated without leaving any residue.

The invention is also of value in the preparation of indophenols by the condensation of p-nitrosophenols with amines and especially carbazol bodies, such as, carbazol and its derivatives, particularly its N-alkyl derivatives. In the preferred production of carbazol-indophenols, a carbazol compound is reacted with a p-nitrosophenol compound, preferably in a concentrated sulfuric acid medium, at a temperature preferably not exceeding —5° C. and especially at temperatures between —15° C. and —40° C. Owing to the rapidity with which this reaction occurs, it is essential, for optimum results, that highly efficient cooling be employed; since the yield and quality of the carbazol-indophenols produced are dependent upon the rapidity with which the condensation occurs and the temperature during the condensation, the more rapid the condensation and the lower the temperature, the purer the product and the greater the yield. External cooling of the reaction mixture is impracticable owing to the slow heat transfer throughout the reaction mixture even with high speed agitation. Internal cooling by means of coils containing circulating brine is expensive and inefficient owing to the large capital investment attendant upon the complicated structure of cooling coils necessary to provide the required cooling, and the large space within the reaction vessel occupied by the coils. By employing an inert normally gaseous substance in the form of a liquid or solid (as for example, liquid air or nitrogen, solid carbon dioxide or sulfur dioxide, etc.) in accordance with the present invention, these reaction mixtures may be maintained at the desired low temperature in an efficient and simple manner, at comparatively low cost.

The invention may be employed, moreover, in other condensation reactions, such as the Friedel-Craft reaction in which anhydrous aluminum chloride or other anhydrous metal chloride is employed as a condensation agent (as for example the production of benzoyl-benzoic acid and its derivatives by the action of a phthalic anhydride compound on hydrocarbons and their derivatives in the presence of anhydrous aluminum chloride), particularly where an organic solvent is employed; in the diazotization of amines; in the coupling of diazo bodies with coupling components for the production of azo bodies; in the rearrangement of hydrazo bodies to benzidine bodies; in the production of nitrosophenols and other nitroso bodies; in the halogenation of organic bodies, such as the chlorination of phenols or of vat dyes, particularly in the presence of concentrated sulfuric acid or organic liquids as solvents or diluents (as for example, in the production of chlorophenol, dichloroindanthrene, etc.); and the like. It also may be employed as an auxiliary cooling method in these or other reactions in conjunction with the usual cooling equipment, and as an emergency expedient to bring under control a reaction mixture which, for any reason, has gotten out of control.

The invention will be illustrated by the following specific examples, but it will be evident to one skilled in the art, that the invention is not limited thereto and that changes may be made in the materials treated, proportions of ingredients, method of procedure, reaction conditions, order of steps and other details without departing from the scope of the appended patent claims.

*Example 1.*—Hydrochloric acid (464 pounds of 20° Bé. acid) is added with efficient stirring to crude xylidine (515 pounds) contained in a suitable reaction vessel at room temperature. As a result of the reaction which occurs, the temperature of the mixture rises to about 60° C. While continuing the stirring, solid carbon dioxide is added to the resulting reaction mixture in an amount sufficient to lower the temperature of the mixture to about 10° C. (About 30 minutes is required to effect this cooling.) The mixture is then stirred at the latter temperature to separate the xylidine hydrochloride formed until no further separation thereof takes place (10 to 12 hours more or less), solid carbon dioxide being added in small amounts, if necessary, to maintain the temperature. When precipitation is complete the xylidine hydrochloride is filtered off from the mother liquor.

As a result of this procedure, a considerable saving in time and equipment is effected. Cooling of the reaction mixture by means of internal coils through which cold brine is circulated requires approximately 8 to 12 hours to bring the reaction mixture to the required temperature. The required cooling is effected, however, in accordance with the above procedure in about 30 minutes. The absence of cooling coils and their attendant circulating and cooling equipment, moreover, reduces the initial and maintenance costs of the apparatus and increases its productive capacity.

*Example 2.*—Carbazol (1 part by weight) is dissolved in sulfuric acid (about 10 parts by weight of 95 to 97 per cent. acid) and the well stirred solution is cooled to about −20° to −25° C. by the addition of solid carbon dioxide thereto. Paranitrosophenol (0.778 part by weight) is dissolved in sulfuric acid (7.5 parts by weight of 95 to 97 per cent. acid) and the well stirred solution is cooled to about −30° to −40° C. by the addition of solid carbon dioxide thereto. The resulting cold carbazol solution is then added to the well stirred cold p-nitrosophenol solution. The addition is made at such a rate that the temperature of the mixture does not rise above about −15° to −20° C. and solid carbon dioxide is simultaneously added in sufficient amounts to assist in maintaining the temperature of the mixture at or below said temperature points. When the addition has been completed, the mixture is stirred for a few minutes to insure completion of the reaction. It is then neutralized by pouring it into an aqueous solution of sodium hydroxide. The solution contains sufficient sodium hydroxide to render the mixture slightly alkaline after all of the acid has been neutralized (about 15 parts of sodium hydroxide in 150 parts of water) and also contains sufficient ice or solid carbon dioxide to maintain the temperature during the neutralization at about 0° C. The resulting precipitate of carbazol-indophenol is filtered off at once and immediately washed with water until free from alkali.

Since, in the practice of the invention, changes may be made in the details of the above disclosure and in the process above described without departing from the scope of the invention, it is intended that all matter contained in the above description shall be interpreted as illustrating, and not limiting, the invention, except as limited by the claims.

I claim:

1. A method of cooling a chemical reaction mixture which comprises converting to the gaseous form a normally gaseous material in the solid form while in direct contact with the reaction mixture.

2. A method of cooling a chemical reaction mixture which comprises adding to the reaction mixture an inert normally gaseous material in the solid form and converting said material to the gaseous form while in contact with said reaction mixture.

3. In the production of an amine salt by the interaction of an organic amine with an acid, the improvement which comprises cooling the reaction mixture by converting to the gaseous form an inert normally gaseous material in the non-gaseous form while in direct contact with the reaction mixture, whereby the resulting amine salt is precipitated.

4. In the production of a hydrochloride of a primary amine of the benzene series, the improvement which comprises reacting the amine with an excess of concentrated hydrochloric acid and directly adding to the resulting reaction mixture solid carbon dioxide to cool the reaction mixture and to precipitate the amine hydrochloride produced.

5. A method of cooling a nitration reaction mixture which comprises converting to the gaseous form an inert normally gaseous material in the non-gaseous form while in direct contact with a reaction mixture containing material to be nitrated and a nitrating agent.

6. In the production of a carbazol-indophenol by the condensation of a carbazol compound with a p-nitrosophenol compound in a concentrated sulfuric acid reaction mixture, the improvement which comprises maintaining the temperature of the reaction mixture below −5° C. by converting to the gaseous form an inert normally gaseous material in the non-gaseous form while in direct contact with the reaction mixture.

7. In the production of a carbazol-indophenol by the condensation of a carbazol compound with a p-nitrosophenol compound in concentrated sulfuric acid as a reaction medium, the improvement which comprises maintaining the temperature of the reaction mixture below −5° C. by converting to the gaseous form an inert normally gaseous material in the solid form while in direct contact with the reaction mixture.

8. In the production of a carbazol-indophenol by the condensation of a carbazol compound with a p-nitrosophenol compound in concentrated sulfuric acid as a reaction medium, the improvement which comprises maintaining the temperature of the reaction mixture between −15° C. and −40° C. by converting solid carbon dioxide to the gaseous form while in direct contact with the reaction mixture.

9. In a process of conducting an exothermal reaction wherein the reaction ingredients are in solution, the art of controlling the temperature of said reaction comprising introducing below the surface of the reaction mixture a solid refrigerant, said refrigerant being of such a nature that it will form a gas at the temperature of the reaction which will bubble through the reaction mixture, functioning to stir and refrigerate the same without producing any deleterious effect thereon.

10. In a process of conducting an exothermal reaction wherein the reaction ingredients are in solution, the art of controlling the temperature of said reaction comprising introducing below the surface of the reaction mixture solid carbon dioxide, whereby the gas evolved from said solid carbon dioxide may be utilized to stir and refrigerate said mixture.

11. Method of controlling the temperature of liquid chemical mixtures and agitating the same, comprising immersing solid carbon dioxide in the mixture to absorb heat therefrom with evolution of carbon dioxide in gaseous form.

12. Method of regulating the temperature of liquid reacting materials and producing active agitation thereof, comprising adding solid carbon dioxide to the materials from time to time as the reaction proceeds to absorb heat and cause evaporation of the solid carbon dioxide.

13. A method of cooling a chemical reaction mixture which comprises converting carbon dioxide from solid to gaseous form while in direct contact with the reaction mixture.

IRVING T. THORNTON.